US011190919B2

(12) United States Patent
Xu et al.

(10) Patent No.: US 11,190,919 B2
(45) Date of Patent: Nov. 30, 2021

(54) METHOD AND DEVICE FOR SWITCHING NFC CARD

(71) Applicant: AIRSTAR DIGITAL TECHNOLOGY CO., LTD., Beijing (CN)

(72) Inventors: Lina Xu, Beijing (CN); Xudong Ge, Beijing (CN); Shilei Li, Beijing (CN)

(73) Assignee: AIRSTAR DIGITAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/827,737

(22) Filed: Mar. 24, 2020

(65) Prior Publication Data
US 2021/0136549 A1 May 6, 2021

(30) Foreign Application Priority Data

Oct. 31, 2019 (CN) .......................... 201911063194.9

(51) Int. Cl.
*G06Q 20/32* (2012.01)
*H04W 4/80* (2018.01)
(52) U.S. Cl.
CPC ..................... *H04W 4/80* (2018.02)
(58) Field of Classification Search
CPC ................. H04W 4/80; H04W 12/47
See application file for complete search history.

(56) References Cited

U.S. PATENT DOCUMENTS

2013/0102246 A1* 4/2013 Gagne ............... G06Q 20/3278
455/41.1
2014/0222670 A1 8/2014 Concannon

FOREIGN PATENT DOCUMENTS

EP 2 584 769 A1 4/2013

OTHER PUBLICATIONS

Extended European Search Report dated Jul. 23, 2020 in European Patent Application No. 20171832.7, 8 pages.
Mifare4mobile: "Specification MIFARE4Mobile—Guidance Manual", Retrieved from the Internet: URL: http://www.mifare4mobile.org/wp-content/uploads/2015/09/MIFARE4Mobile-Guidance.2.1.pdf, Dec. 23, 2013, XP055225895, pp. 1-66.

* cited by examiner

*Primary Examiner* — Tuan H Nguyen
(74) *Attorney, Agent, or Firm* — Oblon, McClelland, Maier & Neustadt, L.L.P.

(57) ABSTRACT

The present disclosure provides a method and device for switching an NFC card. The method can include determining a non-smart NFC card from a card set that includes smart NFC cards that are activated by default. The method can further include performing an activation operation on the non-smart NFC card, and calling the non-smart NFC card on which the activation operation has been completed to perform near-field communication interaction with a card reading device in a case of receiving response information of activation success, where the response information of activation success indicates that the non-smart NFC card and the smart NFC cards do not conflict. Through the technical solution of the present disclosure, the near-field communication interaction efficiency based on the NFC card can be improved.

12 Claims, 10 Drawing Sheets

METHOD AND DEVICE FOR SWITCHING NFC CARD

The present application is based on and claims the priority to the Chinese Patent Application No. 201911063194.9, filed on Oct. 31, 2019, the entire contents of which are hereby incorporated by reference.

TECHNICAL FIELD

The present disclosure relates to a field of computer communication technology, and in particular, to a method and device for switching an NFC card.

BACKGROUND

Near Field Communication (NFC), also known as short-range wireless communication, is a high-frequency wireless communication technology for achieving contactless data transmission between devices. With the continuous improvement of NFC technology, the NFC technology is gaining popularity in mobile devices. Based on a NFC module in the mobile device, a user can implement application communication with a card reader terminal when the screen is off.

SUMMARY

The present disclosure provides a method and device for switching an NFC card. According to a first aspect of embodiments of the present disclosure, a method for switching NFC cards is provided. The method can include determining a non-smart NFC card from a card set, the card set further including a smart NFC card that is in an activated state by default. The method can further include performing an activation operation on the non-smart NFC card and, in response to receiving response information of activation success, calling the non-smart NFC card on which the activation operation has been completed to perform near-field communication interaction with a card reading device, where the response information of activation success indicates that the non-smart NFC card and the smart NFC card do not conflict.

Optionally, the method also includes, in response to receiving response information of activation failure, determining a conflict card in the NFC smart tag that conflicts with the non-smart NFC card, performing a deactivation operation on the conflict cards, and performing the activation operation on the non-smart NFC card in a case where the conflict card is switched to an inactivated state.

Optionally, the method also can include recording information of the conflict cards, and restoring the conflict card from the inactivated state to an activated state based on recorded information, in a case of performing the deactivation operation on the non-smart NFC card on which the activation operation has been completed.

The method can also include performing the deactivation operation on the non-smart NFC card on which the activation operation has been completed, in response to receiving at least one of the following instruction information for: card switching, exiting a current card swiping page, and completing the near field communication interaction.

In an embodiment, determining the non-smart NFC card from the card set includes receiving a switching instruction sent by a user, and determining a card in the card set corresponding to the switching instruction; or in a case where the number of failed communication interactions based on the smart NFC card exceeds a threshold, according to a scene identification corresponding to the communication interaction, determining the NFC card corresponding to the scene identification and not included in an NFC smart tag as the non-smart NFC card. The smart NFC cards can be included in the NFC smart tag.

According to a second aspect of the embodiments of the present disclosure, a device for switching NFC cards is provided. The device can include a first determining module that is configured to determine an non-smart NFC card from a card set, the card set further including a smart NFC card that is activated by default. The device can further include a first activation module that is configured to perform an activation operation on the non-smart NFC card, and an interaction module that is configured to call the non-smart NFC card on which the activation operation has been completed to perform near-field communication interaction with a card reading device in response to receiving response information of activation success, where the response information of activation success indicates that the non-smart NFC card and the smart NFC card do not conflict.

Optional, the device also can include a second determining module that is configured to determine a conflict card in an NFC smart tag that conflicts with the non-smart NFC card in response to receiving response information of activation failure, a first deactivation module that is configured to perform a deactivation operation on the conflict card, and a second activation module that is configured to perform the activation operation on the non-smart NFC card in a case where the conflict card is switched to an inactivated state.

The device can also include a recording module that is configured to record information of the conflict card, and a restoring module that is configured to restore the conflict card from the inactivated state to an activated state based on the recorded information, in a case of performing the deactivation operation on the non-smart NFC card on which the activation operation has been completed.

Further, the device can include a second deactivation module that is configured to perform the deactivation operation on the non-smart NFC card on which the activation operation has been completed, in response to receiving at least one of the following instruction information for: card switching, exiting a current card swiping page, and completing the near field communication interaction.

The first determining module can include a first determining sub-module that is configured to receive a switching instruction sent by a user, and determining a card in the card set corresponding to the switching instruction; or a second determining sub-module that is configured to determining the NFC card corresponding to a scene identification and not included in an NFC smart tag as the non-smart NFC card, according to the scene identification corresponding to the communication interaction, in a case where the number of failed communication interactions based on the smart NFC card exceeds a threshold. The smart NFC card can be included in the NFC smart tag.

According to a third aspect of the embodiments of the present disclosure, an electronic device is provided that includes a processor, and a memory for storing executable instructions of the processor. The processor is configured to execute instructions to implement the method according to any one of the aspects described above.

According to a fourth aspect of the embodiments of the present disclosure, there is provided a non-transitory computer-readable storage medium having stored thereon computer instructions that, when executed by a processor, implement steps of the method according to any one of the first aspects above.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show embodiments of the present disclosure. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the present invention as detailed in the appended claims.

The term used in the present disclosure is for the purpose of describing particular embodiments only and is not intended to limit the present disclosure. As used in the present disclosure and the appended claims, the singular forms "a", "said" and "this" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "upon" or "when" or "in response to a determination".

Figure 1A:
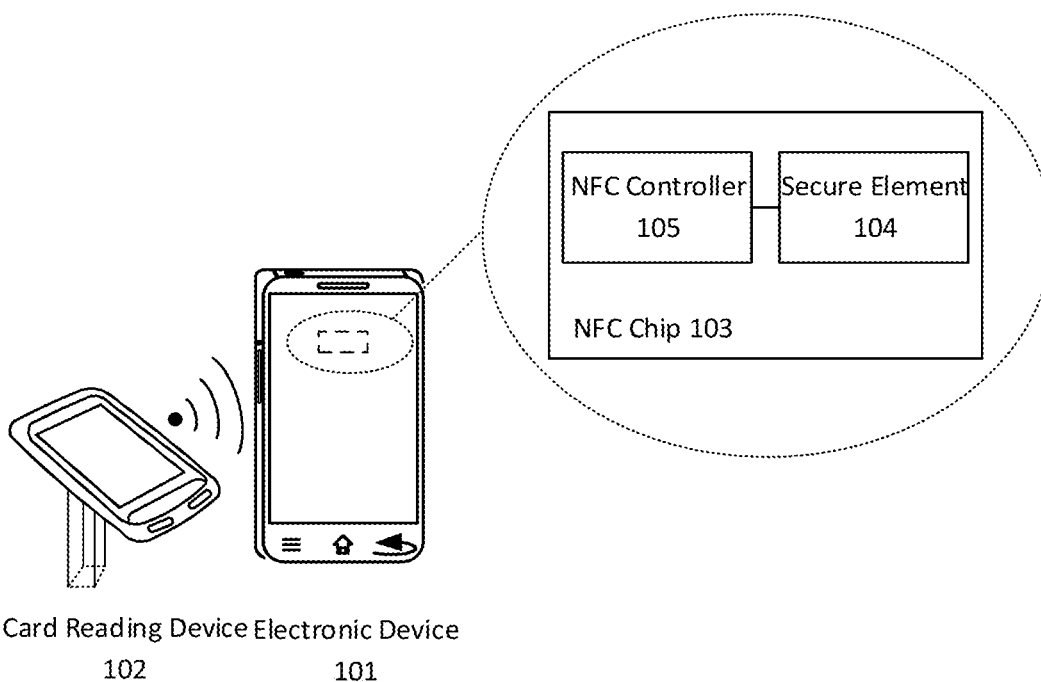
FIG. 1A is a schematic diagram showing an application scenario of performing near-field communication interaction based on an NFC card according to an exemplary embodiment of the present disclosure.

FIG. 1A is a schematic diagram showing an application scenario of performing near-field communication interaction based on an NFC card according to an exemplary embodiment of the present disclosure. As shown in FIG. 1A, an electronic device 101 and a card reading device 102 are included. An NFC chip 103 can be installed in the electronic device 101. The NFC chip may include a secure element 104 (SE for short) or an embedded secure element (ESE for short) and an NFC controller 105, among others. The secure element may also be integrated in a SIM card and be manufactured and sold by a telecommunications operator. It can also be integrated on a printed circuit board (PBC) of the electronic device or a secure digital (SD) memory card. In a case where the secure element is integrated on a printed circuit board (PBC) of the electronic device 101, the secure element may be independent of other software and hardware of the electronic device 101.

The contactless communication front end of the NFC chip forwards the commands received from the external reader to the secure element, then the commands are processed by the secure element and the processed results are replied by the NFC controller. The secure element in the terminal can manage the cards belonging to the users based on the application, which can be understood as having a complete CPU, ROM, EEPROM, RAM, and I/O interfaces. Based on application needs, it can also have a key algorithm processing function to support encryption and decryption algorithms, such as DES, AES, and RSA, to strengthen access control, so that only authenticated applications can access the secure element and communicate with each other. The secure element can also bear the security isolation for the supported data in the electronic device to provide security and confidentiality.

An NFC card swiping system can be set in the card reading device to enable the card reading device to perform near-field communication interaction with the electronic device with the NFC card based on the NFC card swiping system. The NFC card swiping system set in the card reading device can be a bus system, a payment system, an access control system, and the like, the present disclosure does not limit the specific NFC card swiping system in the card reading device.

According to the present disclosure, the term "smart" or "non-smart" does not really represent whether a card or a card set is smart or intelligent, but only a term used for distinction. The use of these term does not limit the card itself. In the embodiments of the present disclosure, the term "NFC smart tag" represents a sub set of a plurality of NFC cards in the terminal that may communicate based on NFC. The NFC cards in the terminal that are included in the sub set is referred to as "smart NFC card", and the NFC cards in the terminal that are not included in the sub set is referred to as "non-smart NFC card". In addition, in the present disclosure, the term "card" or "tag" is not intended to represent a solid card/tag, while in a plurality of embodiments of the present disclosure, they may represent a virtual card simulated by the NFC module of the terminal.

Figure 1B:
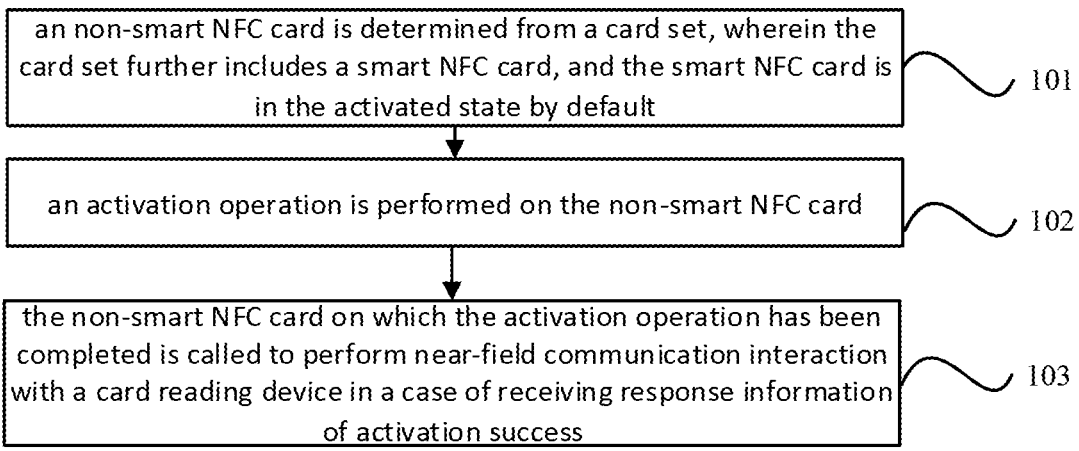
FIG. 1B is a flowchart showing a method for switching an NFC card according to an exemplary embodiment of the present disclosure.

FIG. 1B is a flowchart showing a method for switching an NFC card according to an exemplary embodiment of the present disclosure. As shown in FIG. 1B, the method may include the following steps.

In step 101, an non-smart NFC card is determined from a card set. The card set further includes a smart NFC card that is in the activated state by default. In an embodiment, the user may send a switching instruction for the NFC card through the electronic device, the corresponding electronic device may receive response information corresponding to the switching instruction. The electronic device may receive the switching instruction for the NFC card sent by the user to determine a card corresponding to the switching instruction in the card set, so that the electronic can switch the NFC card according to the user's actual use needs of the card to meet the user's needs for near-field interaction based on different NFC cards in the same application scenario.

In another embodiment, after the user sends the switching instruction through the electronic device, the user can bring the electronic device close to the card reading device to obtain current scene information, such as scene identification information, based on NFC near field communication with the card reading device, and then the electronic device determines the non-smart NFC card corresponding to the scene information in the card set according to the obtained scene information.

Because the electronic device determines the non-smart NFC card to be switched in the card set according to the scene identification information obtained from the NFC near field communication interaction with the card reading device, the electronic device does not need to analyze the card information of the non-smart card to be switched according to the received switching instruction. The user does not need to send corresponding switching instructions based on the non-smart NFC card to be switched. That is, the user can trigger the switching of the NFC card through an indiscriminate virtual or button, thereby simplifying the user's operation, and improving the switching efficiency of the NFC card.

In another embodiment, the electronic device may count the number of the response information with abnormal communication interaction, so that in a case where the electronic device determines that the number of the failed communication interaction based on the smart NFC card (such as, the received number of the response information with abnormal communication interaction) exceeds the threshold, a switching of the NFC can be triggered automatically. That is, according to the current scene identification obtained based on the NFC near field communication, the non-smart NFC card corresponding to the scene identification in the card set is automatically determined as the NFC card to be switched.

The user can determine whether to enable the electronic device to perform the automatic NFC card switching function through the function settings in the electronic device. During the specific setting process, the electronic device can enable the automatic NFC card switching function according to a plurality of manners such as a voice instruction, a gesture instruction, triggering of function keys, which is not limited by the present disclosure.

In step 102, an activation operation is performed on the non-smart NFC card. In an embodiment, the cards of the card set can be classified into smart NFC cards and non-smart NFC cards, and the smart NFC cards can be included in an NFC smart tag, so that the effect of the near field communication interaction of the smart NFC cards included in the NFC smart tag can be realized by the NFC smart tag.

According to the user's actual application requirements, the electronic device can activate the non-smart NFC card to replace the corresponding smart NFC card in the original NFC smart tag, and then use the activated non-smart NFC card for the near field communication interaction.

In step 103, the non-smart NFC card on which the activation operation has been completed is called to perform near-field communication interaction with a card reading device in a case of receiving response information of activation success, wherein the response information of activation success indicates that the non-smart NFC card and the smart NFC cards do not conflict.

In one embodiment, in a case of receiving response information of activation failure, conflict cards in the NFC smart tag that conflict with the non-smart NFC card are determined, a deactivation operation is performed on the conflict cards; and the activation operation is performed on the non-smart NFC card in a case where the conflict cards are switched to an inactivated state.

After the electronic device performs the activation operation on the non-smart NFC card, in the case where there are no conflict cards that conflict with the non-smart NFC card, the electronic device can receive the response information of activation success, and the electronic device can then call the non-smart NFC card on which the activation operation has been completed to perform the near-field communication interaction with a card reading device; in the case where there is a conflict card that conflicts with the non-smart NFC card, the electronic device can receive the response information of activation failure, and the electronic device preferentially performs the deactivation operation on the conflict card, and in the case where the conflict card is switched to the inactivated state, the activation operation is performed on the non-smart NFC card to ensure that the cards in the activated state in the card set are all non-conflict cards.

Further, the electronic device may record information of the conflict card in advance, such as storing the information of the conflict card in a volatile memory or a non-volatile memory, so that in the case of performing the deactivation process on the non-smart NFC card on which the activation operation has been completed, the conflict card recoded in advance is restored from the inactivated state to the active state based on the recorded information.

In an embodiment, the deactivation operation is performed on the non-smart NFC card on which the activation operation has been completed, if receiving at least one of the following instruction information: instruction information for card switching, instruction information for exiting a current card swiping page, and instruction information for completing the near field communication interaction.

Through the above embodiments, the activation operation can be is performed on the non-smart NFC card determined from the card set, so that in the case of receiving response information of activation success, the non-smart NFC card on which the activation operation has been completed is called to perform near-field communication interaction with a card reading device; or in the case of receiving response information of activation failure, the deactivation operation is performed on the conflict cards that conflict with the non-smart NFC card; and the activation operation is performed on the non-smart NFC card in a case where the conflict cards are switched to an inactivated state, so that the electronic device can switch the NFC card according to the usage demand of the user, avoiding the restriction of the various application requirements of the user due to a single and fixed NFC card configuration method, and improving the user's communication interaction efficiency based on different NFC card application requirements in the same scene.

Specific implementation processes of the present disclosure and its related methods are explained below through a group of specific embodiments. In order to achieve a detailed description of the embodiments related to the present disclosure, the inventive content of the present disclosure is explained below based on three main processes. The three main processes are divided into a process in which the server issues the card information to the electronic device, a process in which the electronic device configures the NFC smart tag based on the received card information, and a process in which the NFC card is switched.

First, the server issues a card to the electronic device.

Instead of the card being directly issued to the electronic device, the present disclosure adopts the server to perform the pre-process on the issued cards, that is, to determine the card set belonging to the user of the card receiver and the tag information corresponding to the card set, and then delivers the card set including the tag information to the electronic device used by the user of the card receiver, thereby improving the efficiency of the NFC smart tag configuration based on the cards included in the issued card set by the electronic device. The process of the server issuing the card to the electronic device is explained in detail with the drawings.

Figure 2A:
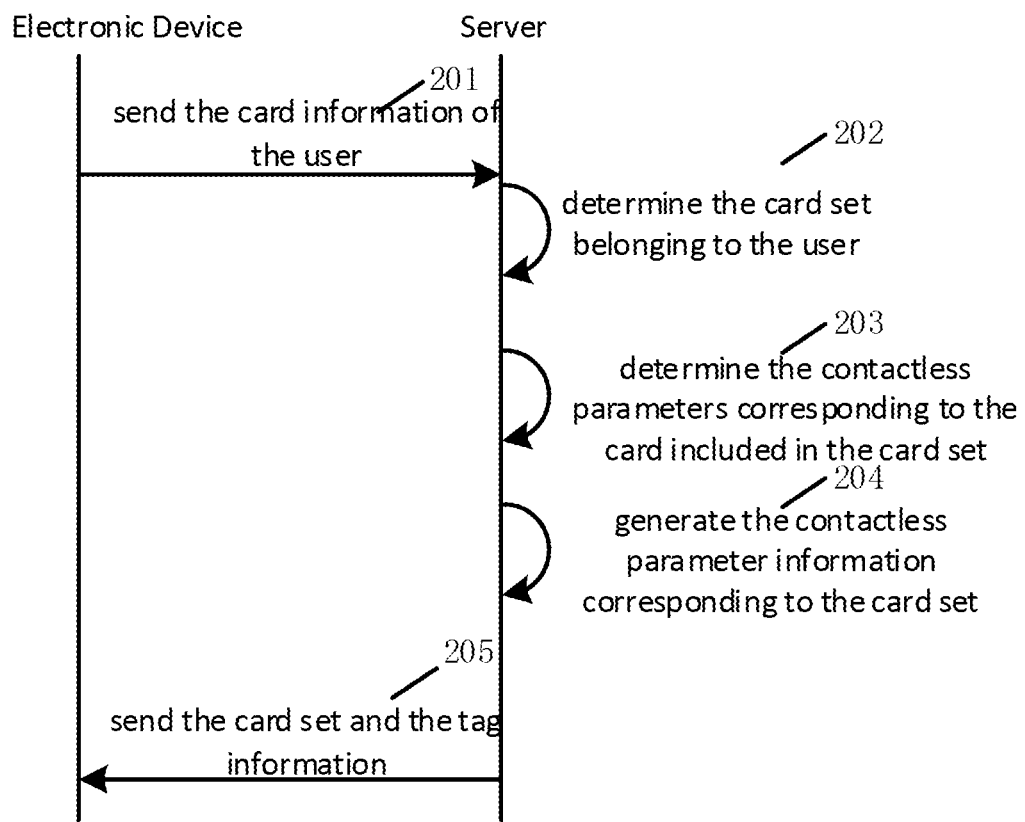
FIG. 2A is an interaction diagram showing a preprocessing method for configuring an NFC smart tag according to an exemplary embodiment of the present disclosure.

FIG. 2A which is an interaction diagram showing a preprocessing method for configuring an NFC smart tag according to an exemplary embodiment of the present disclosure. The method is applied to the server and can include the following steps.

In step 201, the electronic device sends the card information of the user to the server. The user can upload the card information of the card to the server through the electronic device used.

In one embodiment, the user inputs the card information to be uploaded in an application for managing the card set on the used electronic device by manual input, and the electronic device uploads the card information input by the user to the server. The input card information may include a card number, cardholder-related information, and the like. The cardholder-related information may include a cardholder's contact information, a cardholder's name, and a cardholder's ID number, and the like.

Further, the card number can be obtained by the user by use of the photographing function of the electronic device, and the electronic device automatically recognizes the card number corresponding to the card to be added based on the photographed card number. The photo with the card number is obtained by the photographing function, and the card number to be added is determined based on real-time analysis of the obtained photo to the simplify user operations, and improve the efficiency of recording the card number.

During the specific input process, the user can determine the card type of the card to be uploaded first, and then jump to the card information input interface. The card type can include ID cards, ticket cards, and the like, and the ID cards can include bank cards, gas cards, parking cards, bus cards, access cards, membership cards, point cards, and the like. Ticket cards can include air tickets, train tickets, coupons, movie tickets, and the like.

Figure 2B:
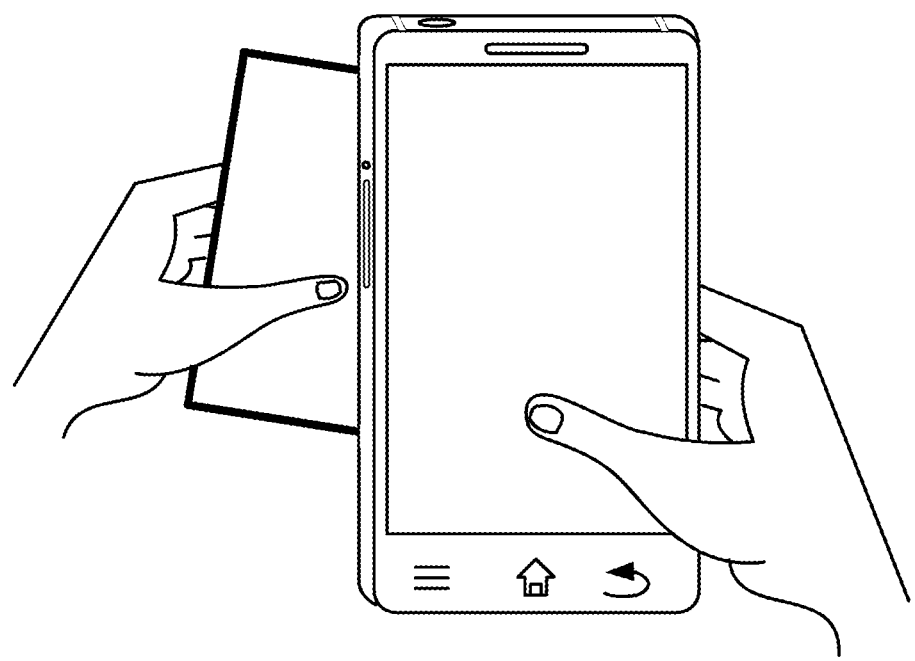
FIG. 2B is a schematic diagram showing an application scenario of a newly added card according to an exemplary embodiment of the present disclosure.

In another embodiment, the electronic device may obtain the card information of the card close to the electronic device based on the NFC communication, so as to send the obtained card information to the server. As shown in FIG. 2B, which is a schematic diagram showing an application scenario of a newly added card according to an exemplary embodiment of the present disclosure, the user can put the card to a designated region of the electronic device used, and then the electronic device obtains the card information to be uploaded based on the NFC communication. In this process, the user does not need to manually input information in the card adding interface, which improves the efficiency of recording the card information.

Before and after obtaining the card information, the display interface of the electronic device used by the user can feedback the user with prompt information such as "please affix the card against the back of the device", "please hold, getting card information", and so on. The process of the information acquisition is fed back to the user through the prompt information to avoid interruption of the information acquisition process of the electronic device due to mis-operation.

In step 202, the server determines the card set belonging to the user. In an embodiment, the server may maintain the card set belonging to the same user. After the card in the card set is activated, the card may be uploaded by the user to the server through the used electronic device, and then the server may maintain the real-time received card information, or the card information can also be dynamically and periodically configured in the server by the administrator based on the data file.

Specifically, the process in which the server maintains the card set belonging to the same user may be that the application data related to the card is dynamically recorded. In one embodiment, the recorded application data may include the user's name, the card number, the card activating date, etc. For some token information authorized by the service provider, the server can send the information such as the received card holder name, the card number to the service provider to obtain the token information returned by the service provider, and stores the obtained token information in association with the card; in another embodiment, the server may only maintain the identification information of the card, and the information sent to the electronic device may be only the identification information of the card, and the information related to the card is supplemented based on the user's interactive operation in the process of adding the card to the NFC smart tag.

In step 203, the server determines the contactless parameters corresponding to the card included in the card set. In one embodiment, the contactless parameters of the card when it is installed in the secure element may be determined as the contactless parameters of the card. Specifically, the contactless parameters of the card during installation may be determined based on the configuration information of the card to be installed. Further, the server may store the contactless parameters of the card and the mapping relationship of the card, and dynamically maintain the stored mapping relationship based on the configuration information corresponding to the card.

In step 204, the server generates the tag information corresponding to the card set according to the determined contactless parameters. The tag information corresponding to the card set is generated based on the contactless parameters corresponding to the card included in the card set, so as to reflect the conflict state, non-conflict state, or conflict state and non-conflict state between the cards included in the card set through the generated tag information.

In one embodiment, each card in the card set and its corresponding contactless parameters can be traversed to determine the card in the card set that is in a conflict state or a non-conflict state with each card one by one. Specifically, the conflict state between the cards in the card set can be determined according to any of the following rules: if there are no contactless parameters in the traversed cards, the cards without contactless parameters in the card set are determined as the card in the non-conflict state with the traversed cards; if there are no contactless parameters in the traversed cards, the card with the non-connection parameter in the card set is determined as the card in the conflict state with the traversed cards; if there are contactless parameters in the traversed cards, the card with the same non-connection parameter in the card set is determined as the card in the non-conflict state with the traversed cards; if there are contactless parameters in the traversed cards, the card with the different non-connection parameter in the card set is determined as the card in the conflict state with the traversed cards.

The following describes the setting manner of the identification information in the embodiment through a simple example. In the practical application, the contactless parameters often involve items such as parameter labels, parameter formats, and parameter types. In order to simplify the representation of contactless parameters, the following uses Parameter* to indicate the value of the contactless parameter. For example, the card set contains card A, card B, card C, card D, and card E, and the corresponding contactless parameters of these five cards are Parameter1, Parameter2, Parameter1, no contactless parameters, and no contactless, respectively. For the card A with the contactless parameter Parameter1, the card C with the same contactless parameter Parameter1 is a card in a non-conflict state with the card A, while the card B with the contactless parameter Parameter2 and the cards D and E without the contactless parameter are all in conflict state with the card A. It is easy to understand that for the card D without the contactless parameter, the card E without the contactless parameter is in the non-conflict state with the card D, while the card A with the contactless parameter Parameter1 and the card B with the contactless parameter Parameter2 are both in the non-conflict state with the card D without the contactless parameter; similarly, for the card B with the contactless parameter Parameter2, the cards A and card C with the contactless parameter Parameter1, and the cards D and card E without the contactless parameter are all in the conflict state with the card B In another embodiment, the cards can be classified based on whether there is a contactless parameter and the value of the contactless parameter corresponding to the card with the contactless parameter, and then the cards belonging to the same category are collectively labeled as being in a non-conflict state, and the cards belonging to different categories are labeled as being in a conflict state.

Specifically, the card without the contactless parameter in the card set belongs to a category without the contactless parameter, and accordingly, the tag information is generated to characterize the non-conflict state for the card without the contactless parameter in the card set; Similarly, the tag information is generated to characterize the non-conflict state for the cards with the same contactless parameters in the card set, while the tag information is generated to characterize the conflict state for the cards with different contactless parameters or between the card with the contactless parameter and the card without the contactless parameter.

The card set consisting of the card A with the contactless parameter Parameter1, the card B with the contactless parameter Parameter2, the card C with the contactless parameter Parameter1, the card D without the contactless parameter, and the card E without the contactless parameter is taken as an example to illustrate the setting manner of the tag information in the embodiment. In this embodiment, the cards in the card set can be classified into three types: no contactless parameter, contactless parameter being Parameter1, and contactless parameter being Parameter2. The type of no contactless parameter includes the card D and the card E, the type of contactless parameter being Parameter1 includes the card A and the card C, and the type of contactless parameter being Parameter2 includes the card B. Accordingly, the tag information is generated to characterize the non-conflict state for the cards D and E, the tag information is generated to characterize the non-conflict state for the cards A and C, and the tag information is generated to characterize the conflict state for the cards B and A. Of course, it is also possible to generate the tag information for the cards B, A, and D to indicate that each pair is in a non-conflict state. The specific representation mode of the tag information is not limited in the present disclosure, and all representation modes of the tag information capable of representing conflict states or non-conflict states between the cards belong to the protection scope of the present disclosure.

In step 205, the server sends the card set and the tag information corresponding to the card set to the electronic device used by the user. In an embodiment, the tag information generated for the card set and the card set may be sent to the electronic device used by the user, so that the electronic device adds at least two cards in the card set that do not conflict with each other to an NFC smart tag according to the tag information. For the cards with the same contactless parameters, since the parameter types and values are the same, there will be no conflicts such as configuration settings or application processes between the cards, and thus the near field communication interaction based on the same smart tag can be performed.

According to the above embodiment, the server generates the tag information for the card set composed of the cards belonging to the same user, so as to mark the cards in the card set regarding the conflict state and/or the non-conflict state, so that the user's electronic device receives the card set containing the tag information, and can quickly determine the cards in the non-conflict state in the card set based on the tag information, without the need for the electronic device to analyze the cards in the card set and their conflict relationships, improving the configuration efficiency of the electronic device.

Figure 3:
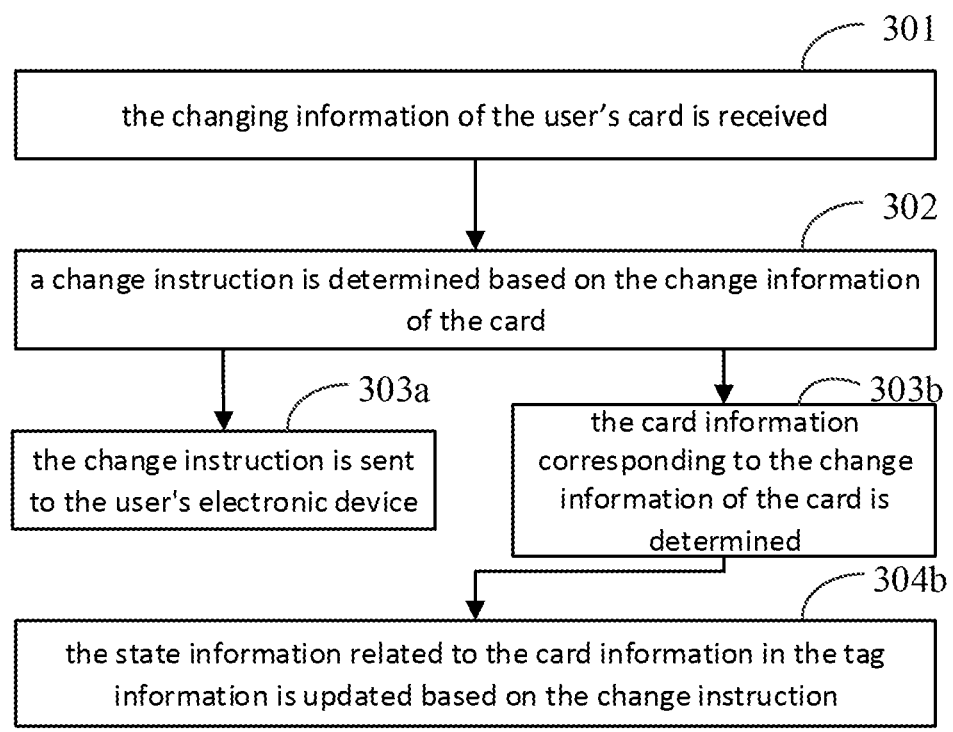
FIG. 3 is a flowchart showing still another preprocessing method for configuring an NFC smart tag according to an exemplary embodiment of the present disclosure.

Please refer to FIG. 3 which is a flowchart showing still another preprocessing method for configuring an NFC smart tag according to an exemplary embodiment of the present disclosure. As shown in FIG. 3, the method may include the following steps.

In step 301, the changing information of the user's card is received. In an embodiment, the user can manage the cards in the card set belonging to the user through the terminal, and send the change information generated after the management to the server through the terminal. Specifically, the application for managing the card set can be a native application pre-installed before leaving the factory, such as Xiaomi Wallet, UnionPay Wallet, and the like, and uses a secure element-based virtual card solution to implement NFC-related functions, or can be an application downloaded from the application store by the user subsequently. The user can change the card in the card set through the application in the terminal. The specific changing manner can include adding cards, deleting cards, or changing card information of existing cards in the card set.

Figure 4:
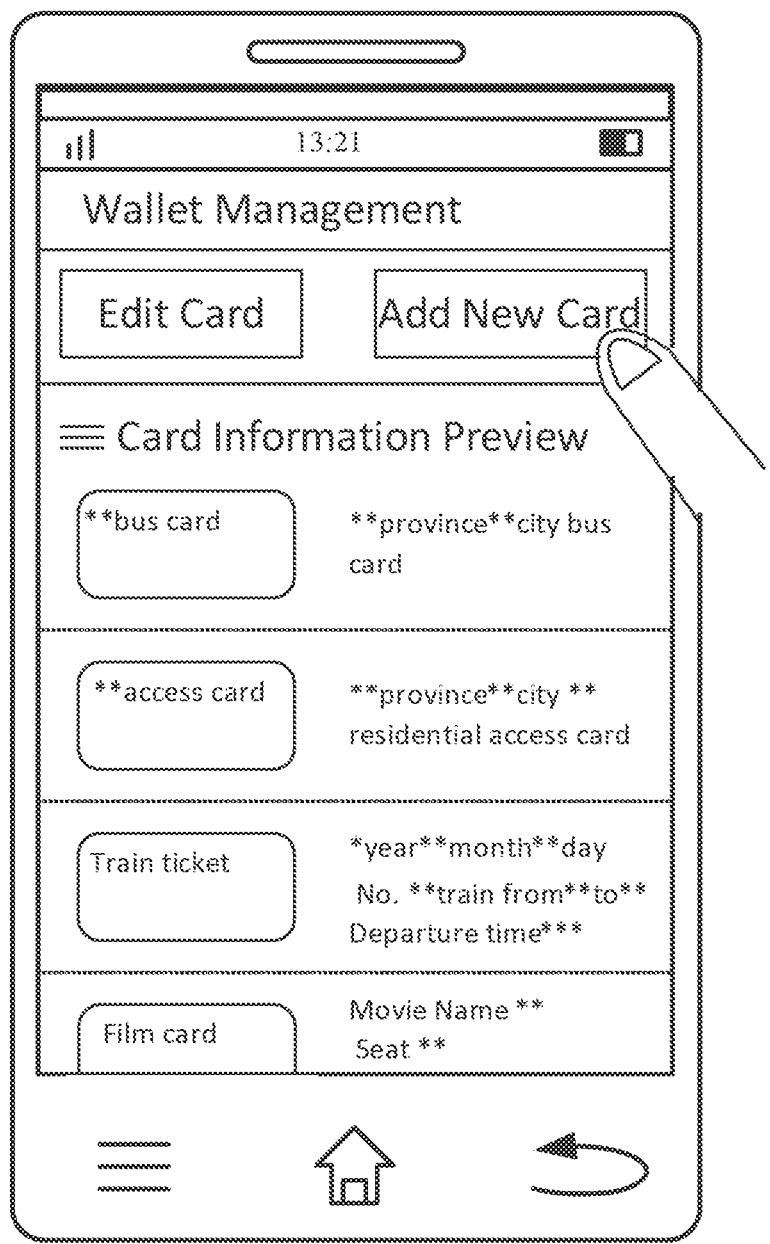
FIG. 4 is a schematic diagram showing an interaction interface for card management according to an exemplary embodiment of the present disclosure.

The following describes the operation mode of the user for changing the card with reference to the accompanying drawings. The specific operation process of adding a card is taken as an example. Please refer to FIG. 4 which is a schematic diagram showing an interaction interface for card management according to an exemplary embodiment of the present disclosure. As shown in FIG. 4, the user can trigger the adding card function of the application by clicking the adding logo in the interface, and the interactive interface jumps to the adding card interface.

Figure 5A:
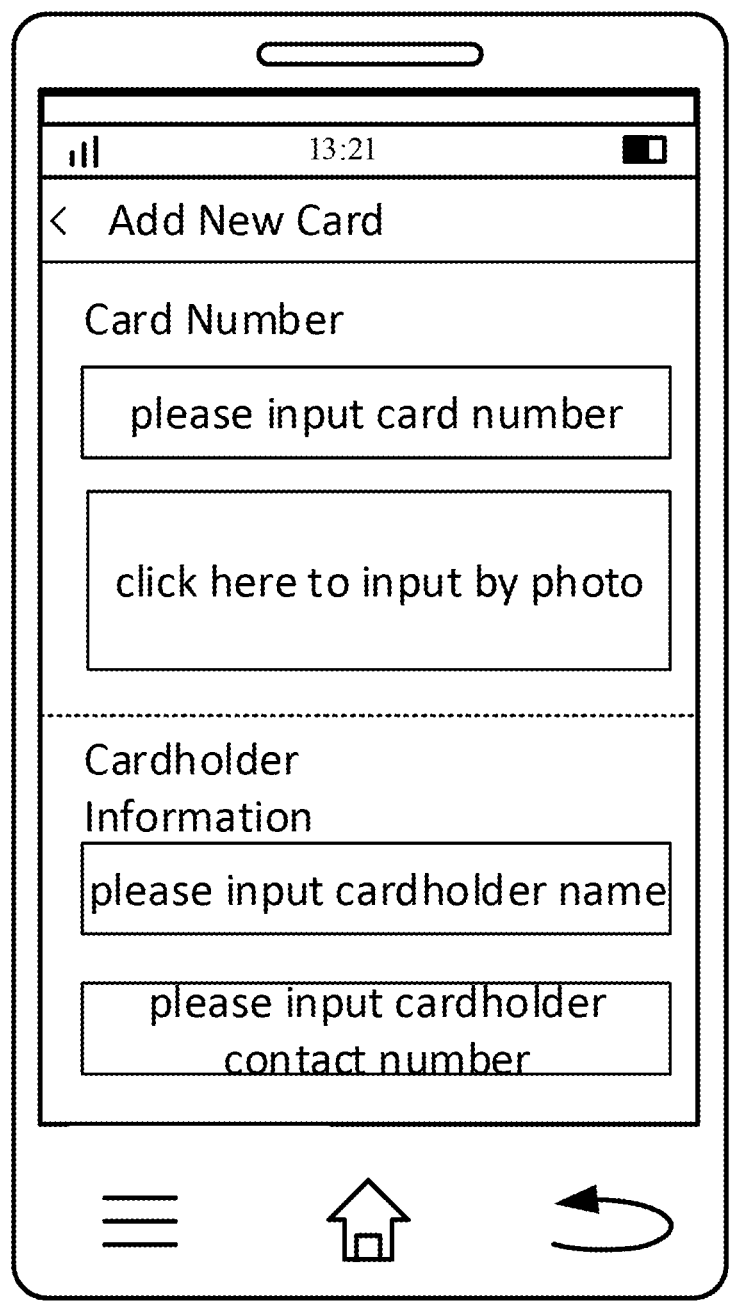
FIG. 5A is a schematic diagram showing an interaction interface of a newly added card according to an exemplary embodiment of the present disclosure.

The user can add the card through the adding card interface, and then the electronic device sends the added cards to the server, so that the server can maintain the card set belonging to the user. Please refer to FIG. 5A and FIG. 5B. FIG. 5A is a schematic diagram showing an interaction interface of a newly added card according to an exemplary embodiment of the present disclosure. As shown in FIG. 5A, the user can input the card information related to the card to be newly added in the interactive interface of the newly added card. Specifically, the user can preferentially select the card type of the card to be newly added and then jump to the card information input interface. The card type can relate to ID cards, ticket cards and the like. The ID cards can include bank cards, gas cards, parking cards, bus cards, access cards, membership cards, point cards, and the like. Ticket cards can include air tickets, train tickets, coupons, movie tickets, and the like. The card information input by the user on the interactive interface may include a card number, cardholder related information, and the like. The cardholder related information may include cardholder contact information, cardholder name, cardholder ID number, and the like.

For the process of obtaining the card number by an electronic device, the photo with the card number can be obtained by means of the photographing function, and the card number to be newly added is determined based on real-time analysis of the obtained photo to the simplify user operations, and improve the efficiency of recording the card number.

Figure 5B:
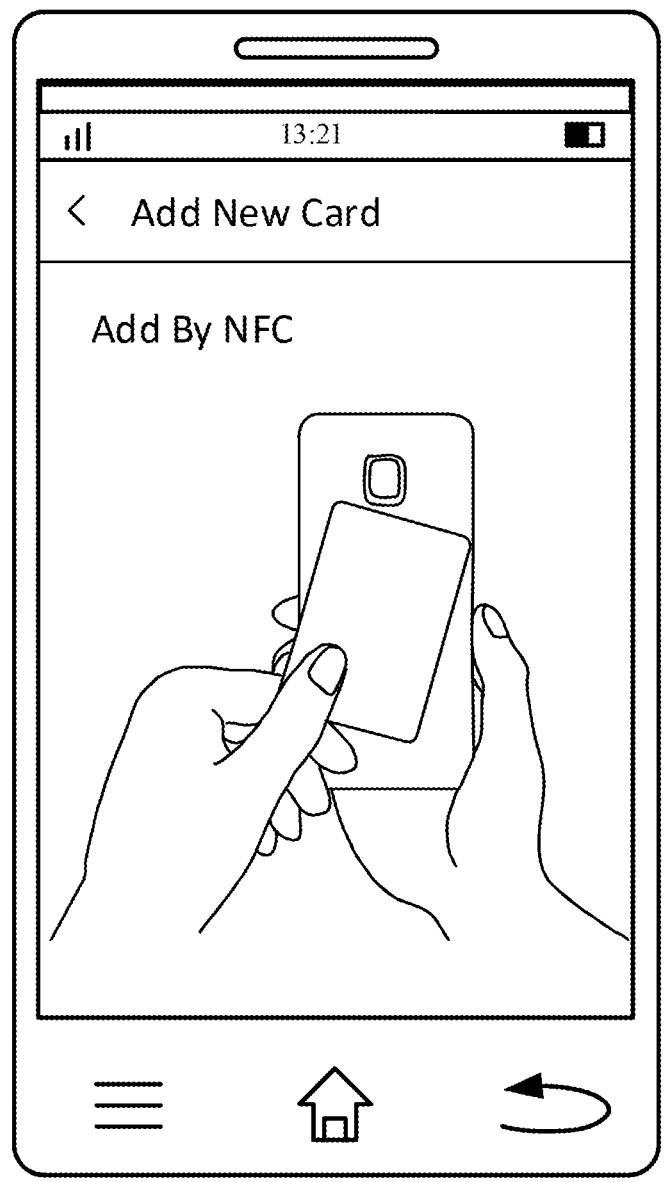
FIG. 5B is a schematic diagram showing an interaction interface of another newly-added card according to an exemplary embodiment of the present disclosure.

During the process in which the electronic device obtains the card related to the card to be newly added, the electronic device may obtain the card information of the card close to the electronic device, so that the electronic device reads the card information related to the card to be added based on the NFC chip. As shown in FIG. 5B which is a schematic diagram showing an interaction interface of another newly-added card according to an exemplary embodiment of the present disclosure. After the electronic device jumps to the newly adding card interface, the electronic device can be triggered to enable the NFC communication function based on the NFC chip. The interface can prompt the operation method of adding a card, such as "please keep the card against the back of the device", "please hold, getting the card information", and the like. The user can attach the card to the back of the terminal, so that the electronic device obtains the card information pre-stored in the chip of the card to be added based on NFC communication, the user does not need to manually input the card information in the adding card interface, and the card information inputting efficiency is improved.

Similarly, for the process of deleting a card or changing the information of an existing card in a card set, the user can enter the interactive interface of displaying the card and trigger the editing function for the displayed card to realize the deletion of the card or the change of the card information. During the change of the card information, the user can manually input the card information in the interactive interface, or attach the card with the information to be changed to the terminal, so that the terminal can read the card information to be changed based on the NFC communication.

In order to improve the operation efficiency of deleting or changing card information, in the case where the application detects the presence of the card close to the terminal, the application automatically obtains the information of the close card, such as the card number or the cardholder name, to compare the related information of the card included in the card set based on the obtained card information. Further, the terminal can maintain the background running state of the application that manages the card set, so that the card attached to the terminal can be detected in the case where the terminal is in an interactive interface of any application.

The terminal can provide feedback to the user based on the comparison result. In the case that the card included in the card set does not correspond to the read card information, the terminal can feedback the prompt information to the user whether to add a card, so that the user can choose whether or not to add the close card to the card set. In the case that the card included in the card set corresponds to the read card information, different types of prompt information can be fed back based on the corresponding information. For example, in the case where the card attached to the mobile phone corresponds to the cardholder information and the card issuing mechanism information of the card included in the card set and does not correspond to the card number, the prompt information about whether the card number of the card is changed or not can be fed back to the user; in the case where the card attached to the mobile phone corresponds to all information of the card included in the card set, the prompt information of whether the card is deleted or not can be fed back to the user; in the case where only the card issuing organization information or the card holder information is the same, the prompt information of whether to add the card or not can be fed back to the user Further, the corresponding card change information can be generated based on the change of the card set by the user, and then the terminal sends the card change information to the server, so that the server obtains the change of the card set by the user.

In step 302, a change instruction is determined based on the change information of the card. The server may generate a corresponding change instruction for the received card change information. Specifically, if the card change information is card deletion information, a card delete instruction corresponding to the card deletion information is generated; if the card change information is card addition information, a card addition instruction corresponding to the card addition information is generated.

The change information represented by the change instruction generated by the server may include change information of the cards included in the card set, and may also include tag information corresponding to the changed card set. The server determines the changed card set according to the received change information, and further determines the tag information corresponding to the changed card set according to the contactless parameters corresponding to the cards included in the changed card set, so as to represent the conflict state between the cards included in the changed card set by the newly determined tag information.

The instruction information may include the correspondence between the changed information and the change method, or the correspondence between the information before the change and the information after the change, or the instruction information may also store the changed information, such as the changed card set and the tag information corresponding to the changed card set, so that the electronic device that receives the change instruction can directly replace the pre-stored card set and the tag information corresponding to the card set based on the instruction information in the change instruction. The present disclosure does not limit the specific manner in which the instruction information is communicated to the change instruction.

In step 303a, the change instruction is sent to the user's electronic device, so that the electronic device updates the card set. The server may send the generated change instruction to the electronic device used by the user, and the electronic device receiving the change instruction adjusts the stored card set and the tag information corresponding to the card set according to the change information corresponding to the change instruction.

Corresponding to the instruction information in the change instruction, the electronic device receiving the change instruction can have multiple update schemes. In an embodiment, the electronic device receiving the change instruction may read the instruction information in the change instruction to determine the information before the change and the information after the change, and then only update the information corresponding to the information before the change in the electronic device, and does not update the information that is not related to the information before the change recorded in the instruction information. In a specific change process, the electronic device determines the storage information corresponding to the obtained information before the change, and further replaces the stored information in the electronic device with the changed information.

In another embodiment, the instruction information in the change instruction received by the electronic device may include the information before the change and the difference in the amount of change of the information. Similarly, the electronic device that receives the change instruction need not process other information that is not related to the information before the change mentioned in the instruction information, but only the change information related to the instruction information. In the specific change processing process, the electronic device determines the storage information corresponding to the obtained information before the change, and further changes the storage information according to the difference in the amount of change of the information in the instruction information, and replaces the stored information in the electronic device with the changed storage information.

In another embodiment, if the instruction information in the change instruction received in the electronic device includes the changed information, the electronic device may directly replace the information stored in the electronic device according to the changed information included in the instruction information. For example, the electronic device may determine the changed card set and tag information corresponding to the card set included in the instruction information, and then use the determined card set and tag information corresponding to the card set to replace the corresponding information maintained in the electronic device.

In step 303b, the card information corresponding to the change information of the card is determined.

In step 304b, the state information related to the card information in the tag information is updated based on the change instruction. The server may update the tag information corresponding to the maintained card set according to the received change information, and store the updated card set and the tag information corresponding to the card set, so as to realizing real-time update and maintenance of the card set of the user and the tag information corresponding to the card set by the server.

Through the above embodiment, the user can upload the change information of the card set belonging to the user to the server through the used electronic device, and the server generates a card change instruction based on the obtained card change information, and then returns the card change instruction to the user's terminal, so that the terminal device maintains the card set and the tag information corresponding to the card set according to the received card change instruction, and at the same time, the server can update the card set and the tag information corresponding to the card set maintained by itself according to the received change information. It is achieved that the server maintains the card information belonging to the user and issues the change information of the card, ensuring the completeness of the cards included in the card set in the electronic device used by the user, without the user manually triggering the update of the card set to improves the efficiency of updating the card set and its corresponding tag information.

Second, regarding a configuration process of the NFC smart tag.

In order to improve the user's use efficiency of near field communication interaction based on the NFC of the electronic device and simplify the user's operation process, the electronic device received the tag information corresponding to the card set issued by the server can set the cards in the card set based on the tag information corresponding to the card set in the present disclosure.

Figure 6:
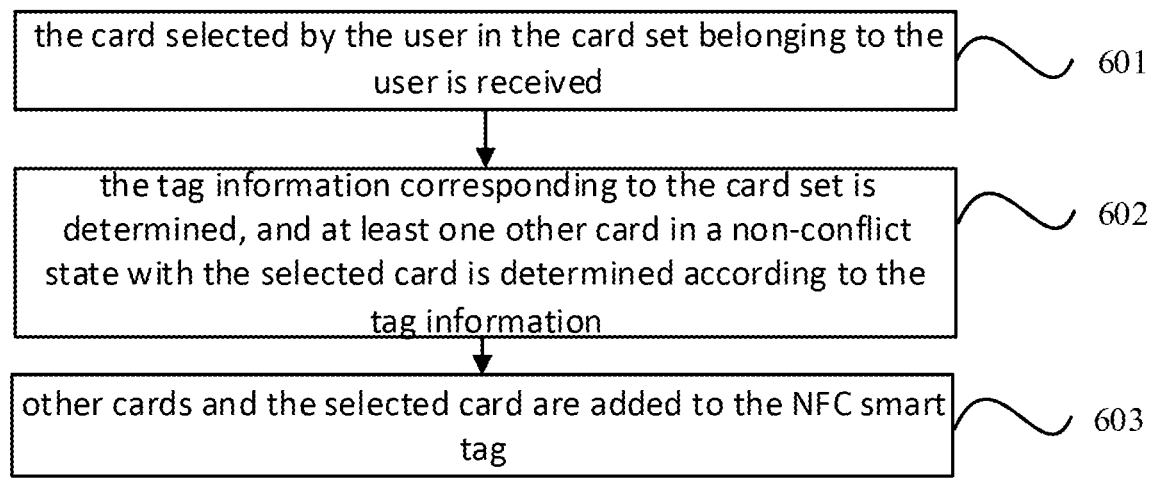
FIG. 6 is a flowchart showing a method for configuring an NFC smart tag according to an exemplary embodiment of the present disclosure.

Specifically, based on the card selected by the user, other cards that do not have a conflict with the selected card can be added to the NFC smart tag, which improves the configuration efficiency of the NFC smart tag by the electronic device. The user can participate in near field communication interaction of multiple scenes based on the NFC smart tag in the activated state without a need to frequently switch the card according to application scenes, thereby improving the scene interaction efficiency of the electronic device. The following describes the configuration process of the NFC smart tag in the present disclosure in detail with reference to specific embodiments FIG. 6 is a flowchart showing a method for configuring an NFC smart tag according to an exemplary embodiment of the present disclosure. The method may include the following steps:

In step 601, the card selected by the user in the card set belonging to the user is received. The card set and the tag information corresponding to the card set are sent to the electronic device used by the user by the server, so that the electronic device can determine the card to be added to the NFC smart tag according to the received card set and the tag information corresponding to the card set.

In an embodiment, the electronic device may automatically determine the card to be added to the NFC smart tag according to a user's adding demand. Specifically, the selection information of the card sent by the user can be received, and the selection information represents the user's demand for the cards in the card set. The electronic device can determine the card selected by the user in the card set belonging to the user according to the received selected information.

In another embodiment, the electronic device may determine the card in the card set to be added to the NFC smart tag according to the application scene information. Specifically, the user may bring the electronic device close to the card reading device, and the electronic device obtains the scene information of the current scene based on the NFC communication with the card reading device, and then determines the NFC card corresponding to the scene information in the card set according to the obtained scene information.

In step 602, the tag information corresponding to the card set is determined, and at least one other card in a non-conflict state with the selected card is determined according to the tag information. The electronic device can obtain the card set and the tag information corresponding to the card set issued by the server. The tag information is generated by the server according to the contactless parameters corresponding to the cards included in the card set. The specific process of the server determining the contactless parameters of the card and generating the tag information corresponding to the card set may refer to the description in the first process, which will not be repeated here.

The tag information received by the electronic device represents a conflict state or a non-conflict state or a conflict state and a non-conflict state between the cards included in the card set. Specifically, the tag information may include at least one of the following: a tag information that there is the non-conflict state between the card without the contactless parameter in the card set and the card selected by the user, in the case of the card selected by the user without the contactless parameter; a tag information that there is the non-conflict state between the card with the contactless parameter in the card set and the card selected by the user, in the case of the card selected by the user with the contactless parameter; a tag information that there is the conflict state between the card with the contactless parameter in the card set and the card selected by the user, in the case of the card selected by the user without the contactless parameter; and a tag information that there is the conflict state between the card with the different contactless parameter in the card set and the card selected by the user, in the case of the card selected by the user with the contactless parameter.

The tag information represents the conflict state, non-conflict state, or conflict state and non-conflict state between the cards in the card set. Since the tag information reflects whether there is a conflict relationship between the cards in the card set, the electronic device can determine the cards in a non-conflict state with the selected card according to the tag information corresponding to the card set, so that the electronic equipment can add at least two cards without the conflict in the card set into the NFC smart tag according to the tag information. Of course, in the special case that there is no card in a non-conflict state with the selected card in the card set, the electronic device may only add the card selected by the user to the NFC smart tag.

In the specific implementation process, the electronic device may feedback the conditions of the card in a non-conflict state determined based on the tag information and the selected card to the user, such as by sending a reminder message, or displaying information related to the determined card on the device, so that the user knows the conditions of the card to be added to the NFC smart tag. After receiving the "OK" information from the user, the electronic device can determine the card selected by the user and other cards which are determined based on the card selected by the user and the tag information corresponding to the card set and are in a non-conflict state with the card selected by the user as the card to be added into the NFC smart tag; instead, after receiving the "cancel" information sent by the user, the electronic device can return to the interface where the user selects the cards in the card set from the interaction interface, so that the user can select the cards in the card set again, and then the cards which are in a non-conflict state with the selected cards are determined again based on the cards selected by the user and the tag information corresponding to the card set.

After receiving the card selected by the user, the electronic device can display the remaining cards except the card selected by the user, so that the user can continue to supplement the selected card. Further, the electronic device may determine the card in a conflict state with the card selected by the user based on the card selected by the user and the tag information corresponding to the card set, and feedback the card information in the conflict state with the selected card to the user to prompt the user that the card in the conflict state may not be selected to be added to the NFC smart tag.

Specifically, the electronic device may set the card having a conflict relationship with the selected card among the remaining cards to being a non-selectable state. For example, after the user's selection information for a card having a conflict relationship is received, the prompt information such as "the card is not allowed to be selected" pops-up, or the electronic device may display only the user-selectable cards among the remaining cards, or display the cards in conflict with the user's selected card in black and white on the display interface, or add non-selectable identification to cards that are in conflict with the card that the user has selected to improve the user's efficiency in learning about the non-selectable cards.

The electronic device receives the user's selection information for the card in the user-selectable state in the remaining cards, and determines the card corresponding to the received selection information as the card selected by the user, and regards the card selected by the user as the card to be added to the NFC smart tag. Similarly, the electronic device can display the remaining cards except the cards selected by the user, determine the cards having conflict relations with the newly selected card in the remaining cards based on the newly selected card of the user, and further determine the cards having conflict relations with the newly selected card in the remaining cards to be in a non-selectable state. Similarly, the electronic device may pop up a prompt message similar to "This card is not selectable", or the electronic device may only display the user-selectable cards among the remaining cards, etc. The prompting mode of the card which is not selectable in the remaining cards is not described again here.

In step 603, other cards and the selected card are added to the NFC smart tag The electronic device adds the user-selected card and at least one other card determined to be in the non-conflict state with the selected card to the NFC smart tag, and the selected card and other cards in the NFC smart tag are in the activated state, so that during the near-field interaction between the user and the card reading device, the interaction can be performed based on the card added in the NFC smart tag in the electronic device.

The process of adding the card to the NFC smart tag can be implemented based on various methods. In one embodiment, the electronic device can determine the scene token information corresponding to the received card, and then add the scene token information to be determined to the smart NFC card. In the process of the electronic device interacting based on the NFC smart tag, the card reading device only needs to perform interactive permission authentication based on the scene token information sent by the electronic device through NFC communication, thereby improving the efficiency of permission authentication.

In another embodiment, the electronic device may receive the card information of the card to be added input by the user, and then upload the card information of the card to be added input by the user to the server, so that the server maintains the card information input by the user, and adds the received relevant information of the cards input by the user into a card set issued by the electronic device used by the user. During the process of configuring the NFC smart tag, the electronic device can add the card information received from the server to the NFC smart tag, so that during the process of the electronic device interacting based on the NFC smart tag, the card reading device can read the information obtained based on the NFC communication. Card information is authenticated.

Through the above embodiment, the electronic device can receive the card set and the tag information corresponding to the card set sent by the server, and determine at least one other card in a non-conflict state with the selected card according to the tag information, and then add the user-selected card and other cards to the NFC smart tag. This process simplifies the user's operation process and improves the user's interaction efficiency for near field communication based on the NFC of the electronic device.

Third, regarding the NFC card switching process.

Figure 7:
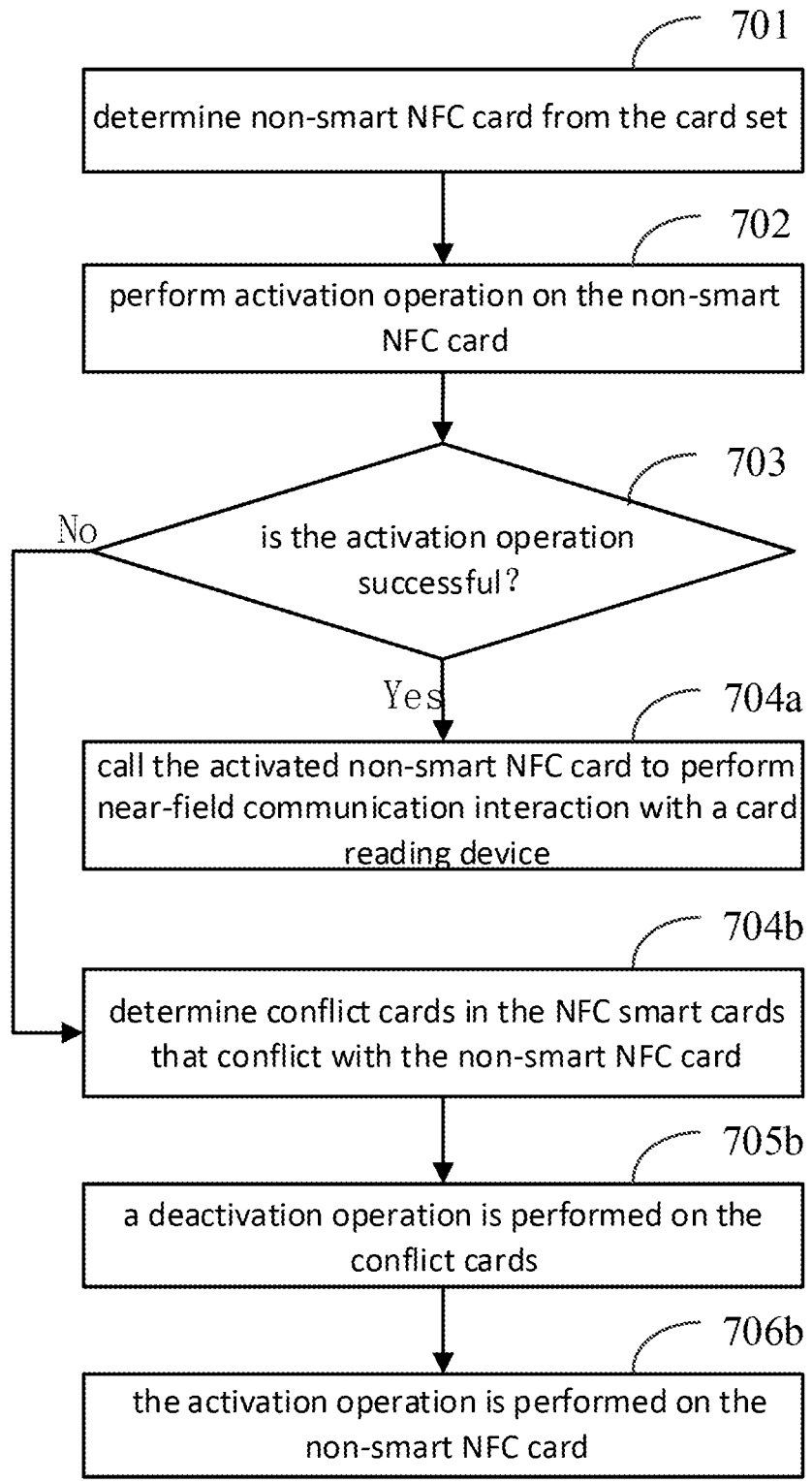
FIG. 7 is a flowchart showing another method for switching an NFC card according to an exemplary embodiment of the present disclosure.

In the case that the NFC smart tag cannot interact or the user has a need for use of a non-smart NFC card other than the NFC smart tag, the user can re-determine the NFC non-smart card from the card set for the near field interaction to meet the user's need for In the application scenario, the application requirements for near-field interaction based on different NFC cards are described below in conjunction with specific embodiments in order to explain the switching process of NFC cards in this disclosure:

Please refer to FIG. 7 which is a flowchart showing another method for switching an NFC card according to an exemplary embodiment of the present disclosure. The method may include the following steps:

In step 701, the non-smart NFC card is determined from the card set.

The virtual card information maintained by the NFC chip in the electronic device can be classified into a smart NFC card and a non-smart NFC card. The smart NFC card includes the card selected by the user and the card in the non-conflict state with the card selected by the user. The card set in the NFC smart tag is in the activated state by default, while the card not set in the NFC smart tag is not in the activated state.

There can be multiple triggering methods for determining the non-smart NFC card from the card set. In one embodiment, the user can select the NFC card to be switched through the electronic device. The electronic device receives the user's selection information for the NFC card and generates the switching instruction based on the NFC card selection information, and then the NFC chip determines the NFC card corresponding to the switching instruction as the non-smart NFC card determined from the card set.

In another embodiment, after the user sends the switching instruction through the electronic device, the user can bring the electronic device close to the card reading device to obtain the current scene information, such as the scene identification information, through NFC communication, and then the electronic device automatically determines the non-smart NFC card corresponding to the scene identification information in the card set according to the obtained scene information.

Specifically, if there is only one non-smart NFC card corresponding to the scene information in the card set, the electronic device may directly determine the non-smart NFC card as the non-smart NFC card determined from the card set; if there are multiple non-smart NFC cards corresponding to the scene information, the electronic device may feedback the non-smart NFC cards corresponding to the scene information to the user, such as displaying the non-smart NFC cards corresponding to the scene information in the electronic device display interface, or sending the information related to the non-smart NFC cards corresponding to the scene information to the user, so that the user can select the NFC card displayed on the display interface by touch, or reply to the information corresponding to the received non-smart NFC card, so that the electronic device obtains selection information of a user on a plurality of non-smart NFC cards corresponding to the scene information, and then determines the non-smart NFC cards corresponding to the received selection as the non-smart NFC cards corresponding to the scene information in the card set In another embodiment, in a case where the electronic device determines that the number of failed communication interactions based on the smart NFC cards exceeds a threshold, the electronic device will automatically determine the NFC card corresponding to the scene identification and not included in the NFC smart tag as the non-smart NFC card according to a scene identification corresponding to the communication interaction, Specifically, the user brings the electronic device close to the card reading device. When the electronic device starts to interact with the card reading device based on NFC communication, the electronic device may count the number of the response information with abnormal communication interaction. Specifically, in a case of the number of the response information with abnormal communication interaction exceeding the threshold, the electronic device determines the scene information of the current communication interaction based on the cache record to determine the NFC card corresponding to the scene identification and not included in the NFC smart tag as the non-smart NFC card.

In step 702, the activation operation is performed on the non-smart NFC card.

In step 703, it is determined whether the activation operation is successful. If successful, the process proceeds to step 704*a*; otherwise, the process proceeds to step 704*b*.

For the non-smart NFC card obtained after the determination, the electronic device may activate the determined non-smart NFC card, so that the electronic device may perform communication interaction with the card reading device according to the activated non-smart NFC card.

In step 704a, the non-smart NFC card on which the activation operation has been completed is called to perform near-field communication interaction with a card reading device in a case of receiving response information of activation success, wherein the response information of activation success indicates that the non-smart NFC card and the smart NFC cards do not conflict.

In step 704b, in a case of receiving response information of activation failure, conflict cards in the NFC smart tag that conflict with the non-smart NFC card are determined.

In step 705b, a deactivation operation is performed on the conflict cards.

In an embodiment, the information of the conflict cards performed the deactivation operation is recorded, so that in the case of performing the deactivation process on the non-smart NFC card on which the activation operation has been completed, the conflict cards recoded in advance are restored from the inactivated state to the active state based on the recorded information.

In step 706b: the activation operation is performed on the non-smart NFC card in a case where the conflict cards are switched to an inactivated state.

In an embodiment, the deactivation operation is performed on the non-smart NFC card on which the activation operation has been completed, if receiving at least one of the following instruction information: instruction information for card switching, instruction information for exiting a current card swiping page, and instruction information for completing the near field communication interaction.

After completing the near field communication interaction based on the non-smart NFC card, the user can click the button that triggers the exit of the interactive interface to exit the non-smart NFC card-based interaction interface. The button can be a virtual button or an entity in an electronic device button.

Similarly, in the case where the user needs to change the non-smart NFC card for near field communication interaction, the user can click a button that can trigger the card switching function to switch the non-smart NFC card currently used for near field communication to other cards in the card set. For example, after receiving the switching instruction sent by the user through the electronic device, the electronic device can restore the activation state of the card included in the NFC smart tag, so that the electronic device can perform near field communication interaction based on the NFC smart tag.

In addition, the electronic device can automatically perform the deactivation processing operation on the non-smart NFC card based on the instruction information for completing near field communication interaction, so as to improve the processing efficiency of the deactivation operation on the non-smart NFC card by the electronic device.

In another embodiment, after completing the deactivation processing operation on the non-smart NFC card, the electronic device can automatically perform the activation operation process of restoring the smart NFC card to maintain the user's real-time response demand for the smart NFC card during use, which improves the response efficiency of electronic devices to NFC communication.

In another embodiment, after the electronic device completes the scene interaction with the card reading terminal, it can feedback the card for scene interaction to the user, so that the user of the electronic device can clearly know the card for interaction. Specifically, after the electronic device completes the scene interaction with the card-reading terminal, the electronic device may prompt through a method such as an application notification or a short message, or display the card for interaction on the terminal, such as the card face of the card and the card issuing mechanism name and other information that can characterize the card's identity.

In yet another embodiment, the smart NFC card is included in the NFC smart tag. When the electronic device performs near-field communication interaction with the card reading device based on the NFC smart tag, an equivalent communication effect of near-field communication interaction with the card reading device based on a corresponding smart NFC card included in the NFC smart tag can be achieved, so that the electronic device can realize near field communication interaction in a plurality of scenes based on the NFC smart tag, and does not need to switch cards according to specific scenes in the plurality of scenes, so that the interaction efficiency of the near field communication is improved.

For example, the card set belonging to user A includes bus card a, bus card b, bus card c, and bank card d. Among them, only bus card a and bank card d are configured in the NFC smart tag, and the smart NFC card is bus card a and bank card d. The non-smart NFC cards are bus card b and bus card c. During use, the user can interact with the card reader terminal of the bus based on the NFC smart tag while riding the bus, so as to achieve the effect of swiping the bus card a. The user can interact with the card reading equipment of the bank supporting NFC based on the NFC smart tag, so that the effect of paying by swiping the bank card d is achieved.

Of course, based on the user's actual usage needs, the user can switch to the non-smart NFC card in the card set for communication interaction. For example, the user A can determine the non-smart NFC card bus card b in the card set for interactive communication. Correspondingly, the electronic device performs the activation operation on the bus card b as the non-smart NFC card. In the case of receiving response information of activation success, the electronic device uses the bus card b on which the activation operation has completed for near field communication interaction.

Through the above embodiment, the electronic device can determine the non-smart NFC card for activation from the card set according to the user's needs, and then perform the activation operation on the non-smart NFC card, and can perform the near field communication interaction according to the non-smart NFC card after the activation operation, which realizes the flexibility for changing the cards used for the near field communication interaction and meets the user's needs for communication based on different cards.

For the foregoing method embodiments, for simplicity of description, they are all described as a series of action combinations, but those skilled in the art should know that the present disclosure is not limited by the described order of actions, because according to the present disclosure, some steps can be performed in another order or simultaneously.

Secondly, those skilled in the art should also know that the embodiments described in the specification are all optional embodiments.

Corresponding to the embodiments of the foregoing application function implementation method, the present disclosure also provides an application function implementation device and corresponding embodiments.

Figure 8:
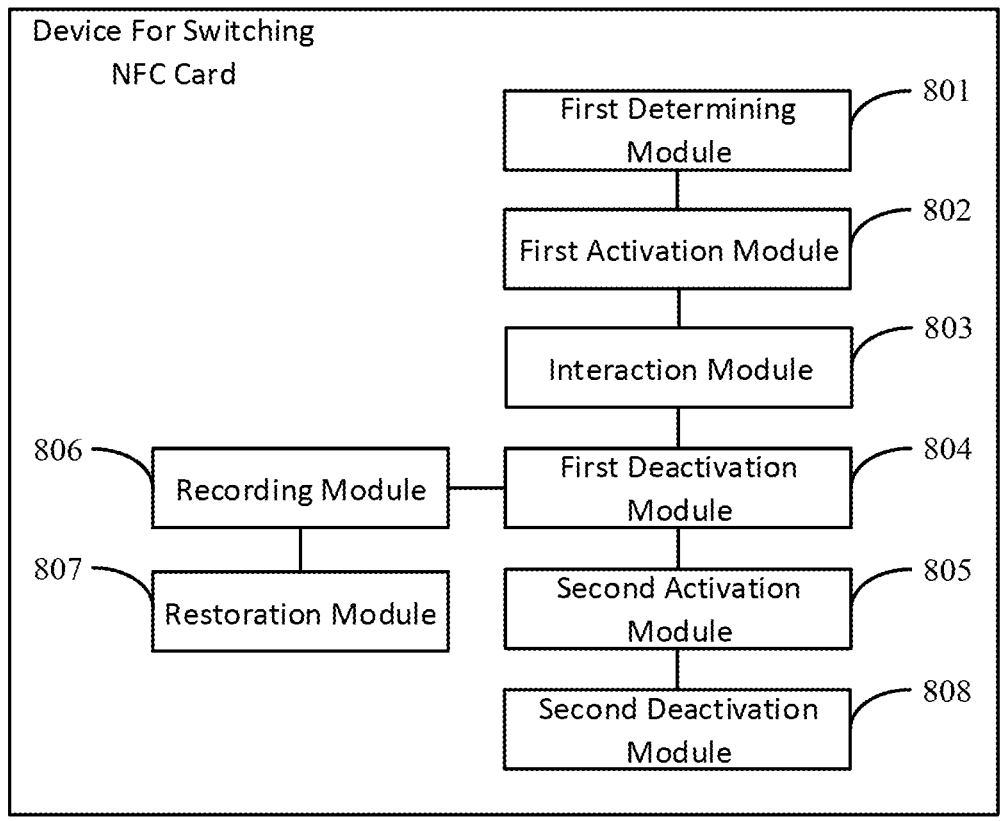
FIG. 8 is a block diagram showing a device for switching an NFC card according to a first exemplary embodiment of the present disclosure.

FIG. 8 is a block diagram showing a device for switching an NFC card according to a first exemplary embodiment of the present disclosure. Referring to FIG. 8, the device may include a first determining module 801, a first activation module 802, and an interaction module 803.

The first determining module 801 determines an non-smart NFC card from a card set, the card set further including smart NFC cards, and the smart NFC cards being activated by default.

The first activation module 802 performs an activation operation on the non-smart NFC card.

The interaction module 803 calls the non-smart NFC card on which the activation operation has been completed to perform near-field communication interaction with a card reading device in a case of receiving response information of activation success, wherein the response information of activation success indicates that the non-smart NFC card and the smart NFC cards do not conflict.

Optionally, the device can also include a second determining module 803 that determines conflict cards in the NFC smart tag that conflicts with the non-smart NFC card in a case of receiving response information of activation failure. A first deactivation module 804 performs a deactivation operation on the conflict cards. A second activation module 805 performs the activation operation on the non-smart NFC card in a case where the conflict cards are switched to an inactivated state.

The device can also include a recording module 806 that records information of the conflict cards. A restoration module 807 restores the conflict cards from the inactivated state to an activated state based on the recorded information, in a case of performing the deactivation operation on the non-smart NFC card on which the activation operation has been completed.

Further, the device can also include a second deactivation module 808 that performs the deactivation operation on the non-smart NFC card on which the activation operation has been completed, if receiving at least one of the following instruction information: instruction information for card switching, instruction information for exiting a current card swiping page, and instruction information for completing the near field communication interaction.

Figure 9:
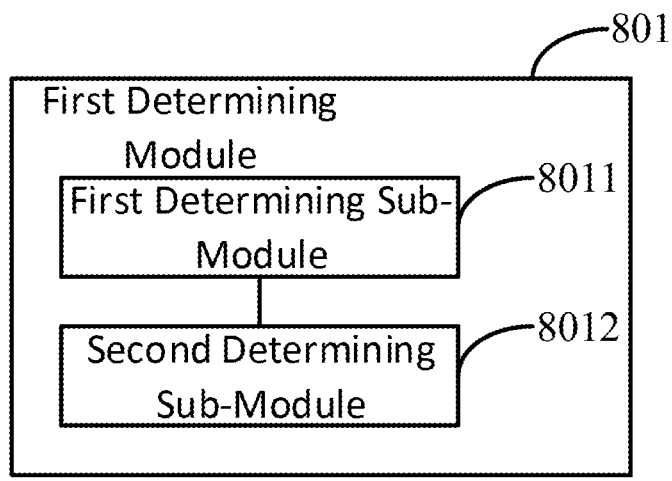
FIG. 9 is a block diagram showing a device for switching an NFC card according to a second exemplary embodiment of the present disclosure.

FIG. 9 shows a block diagram of a device for switching an NFC card according to a second exemplary embodiment of the present disclosure. This embodiment is based on the foregoing embodiment shown in FIG. 8. The first determining module 801 may include a first determining sub-module 8011 and a second determining sub-module 8012.

The first determining sub-module 8011 receives a switching instruction sent by a user, and determining a card in the card set corresponding to the switching instruction. The second determining sub-module 8012 determines the NFC card corresponding to a scene identification and not included in the NFC smart tag as the non-smart NFC card, according to the scene identification corresponding to the communication interaction, in a case where the number of failed communication interactions based on the smart NFC cards exceeds a threshold. The smart NFC card can be included in an NFC smart tag.

As for the device embodiment, since it basically corresponds to the method embodiment, the relevant part may refer to the description of the method embodiment. The device embodiments described above are only schematic, in which the units described as separate components may or may not be physically separated, and the components shown as units may or may not be physical units, that is, may be located in one place, or can be distributed across multiple network elements. Some or all of the modules can be selected according to actual needs to achieve the objectives of the solution of the present disclosure. Those of ordinary skill in the art can understand and implement without creative efforts.

Accordingly, an embodiment of the present disclosure provides an electronic device including a processor; a memory for storing processor-executable instructions; wherein the processor is configured to implement any of the technical features of the technical solution mentioned in the present disclosure.

The technical solutions provided by the embodiments of the present disclosure may include the following beneficial effects. For example, it can be known from the above embodiments that, in a case where all cards included in the NFC smart tag are in the activated state by default, the activation operation can be performed on the non-smart NFC card determined from the card set, so that the near-field communication interaction is performed with the card reading device based on the non-smart NFC card on which the activation operation has been completed. Through the technical solution of the present disclosure, the electronic device can switch the NFC card for near-field communication interaction according to the user's actual application requirements, which improves the near-field communication interaction efficiency based on the NFC card.

Figure 10:
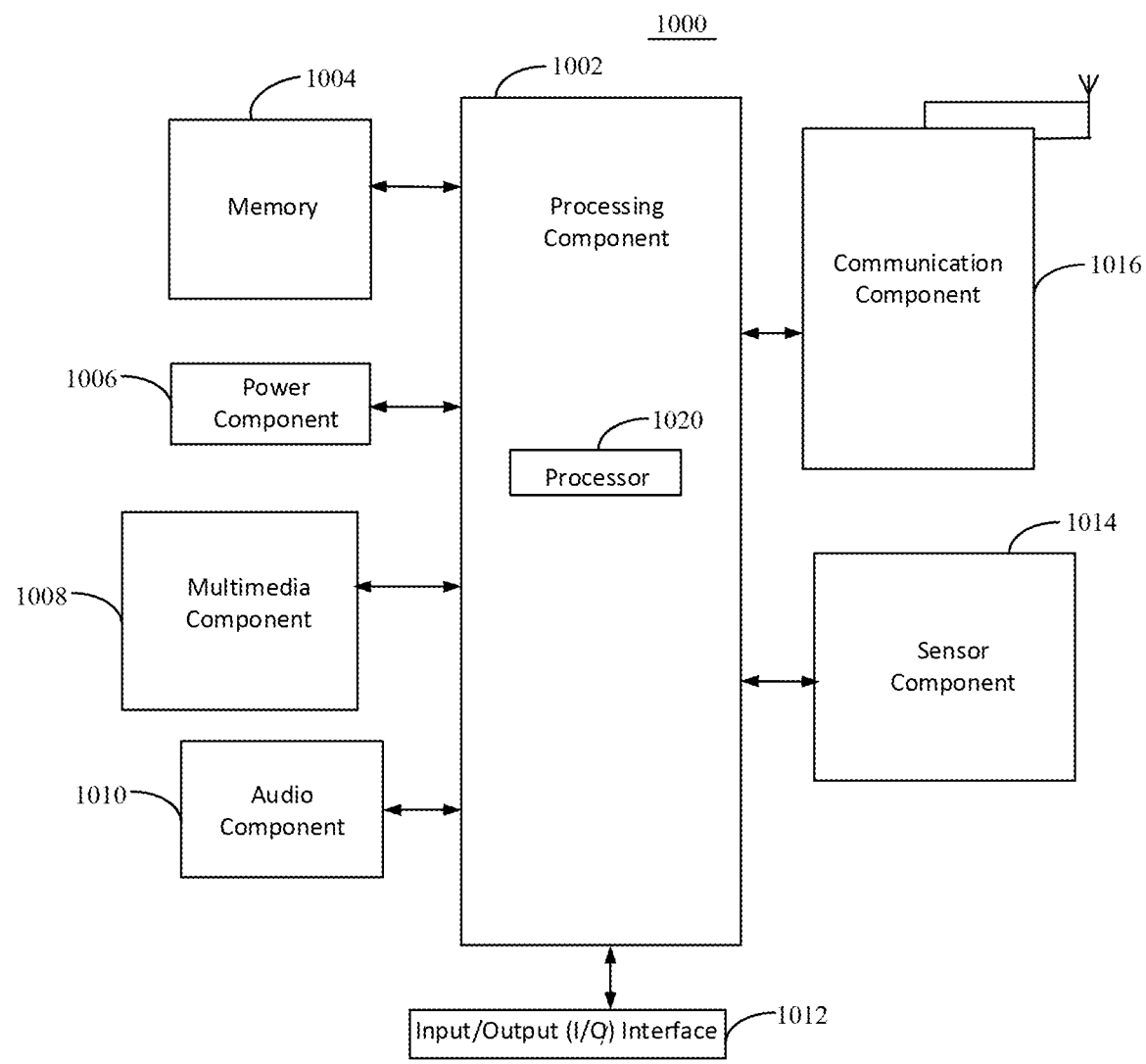
FIG. 10 is a schematic structural diagram showing a device 1000 for switching an NFC card according to an exemplary embodiment of the present disclosure.

FIG. 10 is a schematic structural diagram showing a device 1000 for switching an NFC card according to an exemplary embodiment of the present disclosure. For example, the device 1000 may be a user equipment, which may specifically be a mobile phone, a computer, a digital broadcasting terminal, a messaging device, a game console, a tablet device, a medical device, a fitness device, a personal digital assistant, a wearable device such as a smart watch, a smart glasses, smart bracelets, smart running shoes, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the device 1000, such as the operations associated with display, telephone calls, data communications, camera operations, and recording operations. The processing component 1002 can include one or more processors 1020 to execute instructions to perform all or part of the steps in the above described methods. Moreover, the processing component 1002 can include one or more modules to facilitate the interaction between the processing component 1002 and other components. For example, the processing component 1002 can include a multimedia module to facilitate the interaction between the multimedia component 1008 and the processing component 1002.

The memory 1004 is configured to store various types of data to support the operation of the device 1000. Examples of such data include instructions for any application or method operated on device 1000, such as the contact data, the phone book data, messages, pictures, videos, and the like. The memory 1004 can be implemented by any type of volatile or non-volatile storage device, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 can include a power management system, one or more power sources, and other components associated with the generation, management, and distribution of power in the device 1000.

The multimedia component 1008 includes a screen providing an output interface between the device 1000 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. When the device 1000 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1010 is configured to output and/or input an audio signal. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or sent via the communication component 1016. In some embodiments, the audio component 1010 also includes a speaker for outputting the audio signal.

The I/O interface 1012 provides an interface between the processing component 1002 and peripheral interface modules, such as a keyboard, a click wheel, buttons, and the like. These buttons may include, but are not limited to, a home button, a volume button, a starting button, and a locking button.

The sensor component 1014 includes one or more sensors for providing state assessments of various aspects of the device 1000. For example, the sensor component 1014 can detect an open/closed state of the device 1000, relative positioning of components, such as the display and the keypad of the device 1000. The sensor component 1014 can also detect a change in position of one component of the device 1000 or the device 1000, the presence or absence of user contact with the device 1000, an orientation, or an acceleration/deceleration of the device 1000, and a change in temperature of the device 1000. The sensor component 1014 can include a proximity sensor configured to detect the presence of nearby objects without any physical contact. The sensor component 1014 can also include a light sensor, such as a CMOS or CCD image sensor, configured to use in imaging applications. In some embodiments, the sensor component 1014 can also include an accelerometer sensor, a gyroscope sensor, a magnetic sensor, a pressure sensor, or a temperature sensor.

The communication component 1016 is configured to facilitate wired or wireless communication between the device 1000 and other devices. The device 1000 can access a wireless network based on a communication standard, such as WiFi, 2G or 3G, or a combination thereof. In an exemplary embodiment, the communication component 1016 receives broadcast signals or broadcast associated information from an external broadcast management system via a broadcast channel. In an exemplary embodiment, the communication component 1016 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 1000 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components for performing the above method.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for switching NFC cards, comprising:
performing NFC communication with a card reading device to obtain scene information, and determining a first NFC card corresponding to the scene information from a card set, wherein the first NFC card is not included in a sub set of the card set, and the sub set comprises at least one second NFC card in an activated state;
performing an activation operation on the first NFC card;
in response to receiving response information of an activation success, calling the first NFC card on which the activation operation has been completed to perform near-field communication interaction with a card reading device, wherein the response information of activation success indicates that the first NFC card and the second NFC card do not conflict;
in response to receiving response information of an activation failure, determining a conflict card in the sub set that conflicts with the first NFC card;
recording information of the conflict card;
performing a deactivation operation on the conflict card;
performing the activation operation on the first NFC card once the conflict card is switched to an inactivated state; and
restoring the conflict card from the inactivated state to the activated state based on the recorded information, in a case of performing the deactivation operation on the first NFC card on which the activation operation has been completed.

2. The method according to claim 1, further comprising:
performing a deactivation operation on the first NFC card on which the activation operation has been completed, in response to receiving at least one of the following instruction information for: card switching, exiting a current card swiping page, and completing the near field communication interaction.

3. The method according to claim 1, wherein determining the first NFC card from the card set further comprises:
receiving a switching instruction from a user, and determining a card in the card set corresponding to the switching instruction; or
in a case where the number of failed communication interactions based on the second NFC card exceeds a threshold, according to a scene identification corresponding to the communication interaction, determining the NFC card corresponding to the scene identification and not included in a first sub set as the first NFC card.

4. The method according to claim 1, wherein the second NFC card is included in a first sub set.

5. An electronic device, comprising:
a processor; and
a memory for storing executable instructions of the processor;
wherein the processor is configured to execute instructions to:
perform NFC communication with a card reading device to obtain scene information, and determine a first NFC card corresponding to the scene information from a card set, wherein the first NFC card is not included in a sub set of the card set, and the sub set comprises at least one second NFC card in an activated state;
perform an activation operation on the first NFC card;
in response to receiving response information of an activation success, call the first NFC card on which the activation operation has been completed to perform near-field communication interaction with a card reading device, wherein the response information of activation success indicates that the first NFC card and the second NFC card do not conflict;
in response to receiving response information of an activation failure, determine a conflict card in the sub set that conflicts with the first NFC card;
record information of the conflict card;
perform a deactivation operation on the conflict card;
perform the activation operation on the first NFC card once the conflict card is switched to an inactivated state; and
restore the conflict card from the inactivated state to the activated state based on the recorded information, in a case of performing the deactivation operation on the first NFC card on which the activation operation has been completed.

6. The electronic device according to claim 5, wherein the processor is further configured to:
perform a deactivation operation on the first NFC card on which the activation operation has been completed, in response to receiving at least one of the following instruction information for: card switching, exiting a current card swiping page, and completing the near field communication interaction.

7. The electronic device according to claim 5, wherein the processor is further configured to:
receive a switching instruction from a user, and determine a card in the card set corresponding to the switching instruction; or
in a case where the number of failed communication interactions based on the second NFC card exceeds a threshold, according to a scene identification corresponding to the communication interaction, determine the NFC card corresponding to the scene identification and not included in a first sub set as the first NFC card.

8. The electronic device according to claim 5, wherein the second NFC card is included in a first sub set.

9. A non-transitory computer-readable storage medium having computer instructions stored thereon, wherein the instructions, when executed by a processor, causes the processor to:
perform NFC communication with a card reading device to obtain scene information, and determine a first NFC card corresponding to the scene information from a card set, wherein the first NFC card is not included in a sub set of the card set, and the sub set comprises at least one second NFC card in an activated state;
perform an activation operation on the first NFC card;
in response to receiving response information of an activation success, call the first NFC card on which the activation operation has been completed to perform near-field communication interaction with a card reading device, wherein the response information of the activation success indicates that the first NFC card and the second NFC card do not conflict;
in response to receiving response information of an activation failure, determine a conflict card in the sub set that conflicts with the first NFC card;
record information of the conflict card;
perform a deactivation operation on the conflict card;
perform the activation operation on the first NFC card once the conflict card is switched to an inactivated state; and
restore the conflict card from the inactivated state to the activated state based on the recorded information, in a case of performing the deactivation operation on the first NFC card on which the activation operation has been completed.

10. The non-transitory computer-readable storage medium according to claim 9, wherein the processor is further configured to:
perform the deactivation operation on the first NFC card on which the activation operation has been completed, in response to receiving at least one of the following instruction information for: card switching, exiting a current card swiping page, and completing the near field communication interaction.

11. The non-transitory computer-readable storage medium according to claim 9 wherein the processor is further configured to:
receive a switching instruction from a user, and determine a card in the card set corresponding to the switching instruction; or
in a case where the number of failed communication interactions based on the second NFC card exceeds a threshold, according to a scene identification corresponding to the communication interaction, determine the NFC card corresponding to the scene identification and not comprised in a first sub set as the first NFC card.

12. The non-transitory computer-readable storage medium according to claim 9, wherein the second NFC card is included in a first sub set.

* * * * *